Patented Oct. 27, 1942

2,300,208

UNITED STATES PATENT OFFICE 2,300,208

UREA-ALDEHYDE RESIN COMPOSITION

Gaetano F. D'Alelio, Pittsfield, Mass., assignor to General Electric Company, a corporation of New York No Drawing. Application April 19, 1940, Serial No. 330,555

22 Claims. (Cl. 260—70)

This invention relates to new condensation products and is a continuation-in-part of my copending application Serial No. 169,465, filed October 16, 1937, Patent No. 2,239,440, and assigned to the same assignee as the present invention.

In my above-identified copending application I showed the preparation of resinous compositions by reacting an aliphatic aldehyde, specifically formaldehyde, with an organic compound having a methylene group attached to two adjacent carbon atoms which are at least double bonded and, in turn, are each attached to adjacent nitrogen atoms, for example, malonic diamide, methylene cyanide, cyanoacetamide, etc. The grouping of this class of substances may be represented generally as

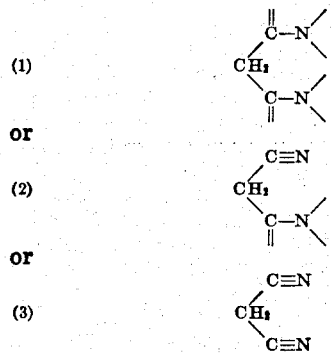

As will be noted from the above graphic formulas, the carbon atoms adjacent to the methylene group are at least double bonded and may be attached either to a double-bonded element, e. g., oxygen, sulfur, selenium, etc., or to a divalent radical, e. g., an imine radical (=NH).

During the reaction of formaldehyde with malonic diamide and other organic compounds of this class, methylol and methylene derivatives are formed as intermediate products. For example, an intermediate compound of the structure

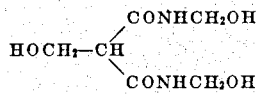

is obtained when malonic diamide is reacted with suitable proportions of formaldehyde. When dehydrated, this intermediate compound yields

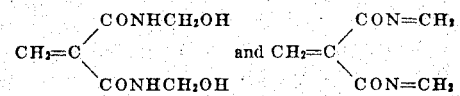

I also showed in application Serial No. 169,465 that these methylol and methylene derivatives not only were resin-forming in themselves, but that certain advantages accrued when they were intercondensed with phenol-formaldehyde partial condensation products. Or, valuable resinous compositions may be produced by intercondensation of a phenol, an aliphatic aldehyde, e. g., formaldehyde, and malonic diamide or the like.

The present invention is based on my discovery that new and useful resins can be produced by intercondensing ingredients comprising (1) a urea, (2) an aldehyde of the class consisting of aliphatic aldehydes and furfural, and (3) an organic compound which may be graphically represented by the formula

where X is a member of the class consisting of nitrile (—C≡N) radicals, and carbamyl and thiocarbamyl radicals having at least one hydrogen atom attached directly to the nitrogen atom thereof. Illustrative of such carbamyl and thiocarbamyl radicals are those which may be represented by the formulas

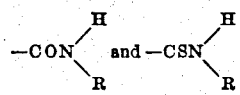

where R represents hydrogen, or alkyl, aryl (including naphthyl), aralkyl, alkaryl, acyl, hydrocyclic, heterocyclic, etc., radicals, or nitro, halogeno, aceto, carbalkoxy, acetoxy, etc., derivatives of such radicals.

Heretofore in applications involving solutions of aminoplasts (resinous condensation products prepared from amino or amido compounds), considerable difficulty has been experienced in obtaining syrups free from solid precipitates and of sufficient time stability. In order to obtain clear or uniform syrups it was necessary to prevent precipitation by the addition of suitable emulsifying agents or solvents, or to remove the precipitates by mechanical means such as filtration. Such practices added to the manufacturing cost. Further, some of the addition agents heretofore employed for this purpose impart other undesirable characteristics to the resin. For example, polyhydric alcohols lessen the resistance of the resin to water, while monohydric alcohols and monoamides decrease the molecular weight and the heat resistance of the resin.

The above difficulties are obviated by carrying the present invention into effect. The resin syrups of this invention are, in general, either clear liquids or homogeneous dispersions. They have exceptional time stability, that is, the resin syrups show very little tendency to gel upon long standing. This is in marked contrast with the prior urea-resin syrups in which either a precipitate formed or gelation started after the syrup had been stored for comparatively short periods of time. This necessitated a prompt use of the resin after manufacture. Further, in applications such as coating and laminating the use of a non-uniform syrup or a syrup containing solid precipitates causes imperfections in the finished product. My invention provides homogeneous resin syrups by the use of which laminated products and coated surfaces free from physical defects can be obtained.

In producing urea-resin molding compounds having sufficient plastic flow it has been the common practice to add various plasticizers, e. g., tricresyl phosphate, to the molding composition. These plasticizers usually are insoluble in the resin syrup. Hence great care had to be exercised in incorporating them into the molding compound. The use of mutual solvents or the introduction of the plasticizer in the form of a dispersion was both inconvenient and costly. Molding compositions produced from the new resins of this invention usually require no plasticizer or, for special applications where extreme conditions of flow are required, only a very small amount of plasticizer is needed. This is because of the inherent plastic nature of these new resins. Since little or no plasticizer is required, manufacturing costs are decreased and the production of more uniform molding compositions is facilitated.

The polymerizable double bond in the methylene malonic diamide (or equivalent material) is believed to be beneficial in stabilizing against discoloration the white or light-colored molded articles of this invention. Under heat this double bond may combine with oxygen and thus eliminate oxidation products that tend to darken the molded articles.

I am aware that the broad suggestion has been made heretofore that resinous compositions may be obtained by condensing formaldehyde or its polymers with polyamides of polycarboxylic acids, more particularly those containing more than four carbon atoms, e. g., polyamides of adipic acid, suberic acid, phthalic acid, etc. It also has been suggested that the properties of such resinous condensation products may be altered by adding before, during or after the condensation substances capable of reaction with formaldehyde, e. g., urea and its derivatives, phenols and aniline. However, to the best of my knowledge and belief, resinous compositions were not prepared prior to my invention by intercondensing a plurality of reactants including an aliphatic aldehyde or furfural and an organic compound having the graphic formula

where X is a member of the class consisting of nitrile radicals, and carbamyl and thiocarbamyl radicals having at least one hydrogen atom attached directly to the nitrogen atom thereof, which compound hereafter for brevity is designated generally as "malonic compound." Likewise, to the best of my knowledge and belief, it was not known or appreciated prior to my invention that particularly useful, relatively inexpensive resins could be obtained by intercondensing furfural or an aliphatic aldehyde, a malonic compound, and a different organic compound capable of forming a methylol derivative as an intermediate during the resin formation, specifically a urea; or, by intercondensing a malonic compound (or a partial condensation product, e. g., a methylol derivative, of a malonic compound and furfural or an aliphatic aldehyde, e. g., formaldehyde) with a partial condensation product, e. g., a methylol derivative, of a urea and furfural or an aliphatic aldehyde.

In producing the resinous compositions of this invention the condensation between the reactants may be carried out under acid, alkaline or neutral conditions. Any substance or catalyst which has an acid or an alkaline nature may be used to obtain the acid, alkaline or neutral condition under which the reactants are intercondensed. For example, I may use ammonia, calcium hydroxide, sodium and potassium hydroxides, methyl amine, diethyl amine, triisopropyl amine, ethanol amine, triisopropanol amine, etc.; mixtures of such alkaline substances; inorganic and organic acids such as hydrochloric, sulfuric, phosphoric, acetic, acrylic, crotonic, malonic, etc.; mixtures of such acids; acid salts such as sodium acid sulfate, monosodium phosphate, monosodium phthalate, etc.; mixtures of acid salts; basic salts such as ammonium carbonate, sodium and potassium carbonates, sodium acetate, etc.; and mixtures of basic salts.

I may condense the components used in practicing this invention under various conditions. For example, all the components may be mixed together and the reaction caused to proceed under acid, alkaline or neutral conditions. Or, I may effect partial condensation between the chosen aldehyde and a urea, then add the malonic compound and effect further condensation. Or, I may first partially condense the malonic compound with the aldehyde under acid, alkaline or neutral conditions and then add a urea and effect further condensation. Or, I may separately partially condense (1) a urea with the aldehyde and (2) a malonic compound and the aldehyde, thereafter mixing the two products of partial condensation and effecting further condensation therebetween. The reactants of (1) and of (2) initially may be condensed under acid, alkaline or neutral conditions. The above reactions may be carried out in the presence or absence of other substances as, for example, fillers, solvents or diluents, other natural and synthetic bodies, etc.

In effecting reaction between the chosen aldehyde (an aliphatic aldehyde or furfural) and the malonic compound, various mol ratios of reactants may be employed as desired or as conditions may require, but the proportions usually are within the range of ¾ to 6 mols aldehyde for each mol of the malonic compound. Preferably I use approximately 1 to 4 mols aldehyde per mol of the malonic compound. The resulting methylol or methylene derivatives then may be condensed with a urea or with a partial condensation product, e. g., a methylol derivative, of a urea and the chosen aldehyde. In preparing such partial condensation products of a urea and an aliphatic aldehyde or furfural, the mol ratios of reactants may be varied as desired or as conditions may require, but usually the proportions are within the range of ¾ to 6 mols of the aldehyde for each mol of the urea body, for example from 1 to 4 mols of the former for each mol of the latter.

The ratio of the total molar amount of urea substance and malonic compound to aldehyde may vary considerably, depending upon the particular starting reactants, the conditions of reaction and the particular properties desired in the end-product, but generally is within the range of ¾ to 6 mols aldehyde for each mol of total urea body and malonic compound (that is, 1½ to 12 mols aldehyde for each two mols of total urea body and malonic compound). Particularly good results are obtained with the use of 1½ to 2½ mols aliphatic aldehyde, specifically formaldehyde, for each mol of total urea substance and malonic compound. Mainly for economic reasons I prefer to use not exceeding substantially one mol of the malonic compound for each mol of the urea substance, and usually employ less than 0.6 mol, more particularly from about 0.05 to 0.5 mol of the former for each mol of the latter.

In producing the new condensation products of this invention, the reaction between the components may proceed under a wide variety of time, pressure and temperature conditions. The temperature of reaction may vary from room temperature to the reflux temperature of the reactants at reduced, atmospheric or superatmospheric pressure. Advantageously the reaction between the components may be initiated at a pH above 7.0 and completed at a pH below 7.0.

The heat-convertible (soluble, fusible) resinous reaction products of this invention may be converted to an insoluble, infusible state under heat or under heat and pressure by methods now well known to those skilled in the resin art. Latent curing catalysts or active (direct) curing catalysts may be suitably incorporated into the resinous mass or into molding compositions produced therefrom, for example by adding the catalyst to a resin syrup obtained by partial condensation of the initial reactants. Self-curing resinous bodies, that is, potentially reactive resins capable of curing under heat to an insoluble, infusible state without the addition of a latent or an active curing catalyst, may be produced by intercondensing certain other reactants with the aldehyde, urea substance and malonic compound, as hereafter more fully described.

Depending upon the particular reactants employed and the particular conditions of reaction, the intermediate (potentially reactive) condensation products vary from clear, colorless, water-soluble liquids to milky dispersions. These liquid intermediate condensation products may be concentrated or diluted further by the removal or the addition of solvents to form liquid coating compositions of adjusted viscosity and concentration. These liquid compositions may be used, for instance, as surface coating materials, as anticreasing agents, in producing laminated articles, and for numerous other purposes. The liquid intermediate products may be used alone, or mixed with fillers, dyes, pigments, lubricants, etc., in the production of molding compositions. Also, these products may be dried and granulated to form clear, unfilled, heat-convertible resins.

In order that those skilled in the art better may understand how the present invention may be carried into effect, the following examples are given by way of illustration. All parts are by weight.

*Example 1*

| | Parts |
|---|---|
| Aqueous solution of formaldehyde (approximately 37.2% HCHO) | 161 |
| Urea | 54 |
| Malonic diamide | 10.2 |
| Sodium hydroxide in 5 parts water | 0.2 |
| Mono-chloroacetyl urea | 3.45 |

The formaldehyde, urea and malonic diamide were mixed in the stated order and, when solution had occurred, 0.2 part sodium hydroxide in 5 parts water was added and the mass heated under reflux for 30 minutes. An aldehyde-reactable halogenated acylated urea in which at least one halogen atom is attached to an alpha carbon atom, a beta carbon atom or alpha and beta carbon atoms, specifically mono-chloroacetyl urea (3.45 parts), was now added and heating continued under reflux for an additional 12 minutes. The chloroacetyl urea intercondensed with the partial condensation product of urea, formaldehyde and malonic diamide to yield a resin syrup capable of curing under heat without the addition of a latent or an active curing catalyst. The resulting resin syrup was compounded with 74.8 parts alpha flock and 0.58 part of a mold lubricant, specifically zinc stearate, and thereafter dried for 85 minutes at about 55° C. Well-cured molded articles, showing good plastic flow during molding, were obtained by molding the dried molding composition for 3 minutes at 135° C. under a pressure of about 4000 pounds per square inch. The molded articles were strong and had a good surface appearance.

*Example 2*

Same formula and general procedure as described under Example 1 with the exception that, instead of the reactant chloroacetyl urea, a latent curing catalyst, specifically diethyl chloracetamide, was added to the partial condensation product of urea, formaldehyde and malonic diamide. The reaction mass was heated under reflux for 10 minutes after the addition of the diethyl chloracetamide. Molding compositions and molded articles were prepared from the resulting resin syrup as described under Example 1. The molded products had the same general properties as the products of Example 1.

*Example 3*

| | Parts |
|---|---|
| Aqueous solution of formaldehyde (approximately 37.2% HCHO), neutral | 161 |
| Urea | 54 |
| Malonic diamide | 10.2 |
| Phthalic anhydride | 5 | were mixed in the above order, heated to boiling, and allowed to cool. The resulting syrup cured rapidly at temperatures of the order of 120° to 150° C. to an insoluble, infusible state.

*Example 4*

| | Parts |
|---|---|
| Aqueous solution of formaldehyde (approximately 37.2% HCHO), neutral | 161 |
| Urea | 54 |
| Malonic diamide | 10.2 |
| 10% acetic acid solution | 1.2 | were mixed in the above order and heated under reflux for 6 minutes. This resin syrup also cured rapidly under heat, e. g., at 120° to 150° C., to an insoluble, infusible state.

Example 5

| | Parts |
|---|---|
| Aqueous solution of formaldehyde (approximately 37.2% HCHO), neutral | 161 |
| Urea | 54 |
| Malonic diamide | 7.95 |
| Hydrochloric acid in 5 parts water | 0.018 | were mixed in the above order and heated under reflux for 1 minute. This acid-catalyzed resin syrup cured rapidly at temperatures of the order of 120° to 150° C. to an insoluble, infusible state.

Example 6

| | Parts |
|---|---|
| Urea | 54 |
| Aqueous ammonia (28%) | 7.6 |
| Aqueous solution of formaldehyde (approximately 37.2% HCHO) | 161 |
| Sodium hydroxide in 1.5 parts water | 0.06 |
| Malonic diamide | 10.2 |
| Hydrochloric acid in 11.7 parts water | 0.042 |

All of the above components with the exception of the hydrochloric acid were mixed in the above order and heated under reflux for 30 minutes. The hydrochloric acid was added and refluxing continued for an additional 10 minutes. The resulting resin syrup was compounded with 71.3 parts alpha flock and 0.59 part zinc stearate, and thereafter dried for 90 minutes at about 55° C. Strong molded articles of good surface appearance were obtained by molding the dried composition for 3 minutes at 130° C. and a pressure of about 4000 pounds per square inch. The molded articles showed good plastic flow during molding.

Example 7

| | Parts |
|---|---|
| Urea | 54 |
| Aqueous ammonia (28%) | 7.6 |
| Aqueous solution of formaldehyde (approximately 37.2% HCHO) | 161 |
| Sodium hydroxide in 1.5 parts water | 0.06 |
| Malonic diamide | 10.2 |
| 10% acetic acid solution | 5.85 |

The urea, ammonia, formaldehyde and sodium hydroxide were mixed in the stated order and, when solution had occurred, the malonic diamide was added and the mass was heated under reflux for 30 minutes. The acetic acid solution was now added and the mixture was heated for an additional 10 minutes under reflux. A molding composition was prepared from the resulting resin syrup as described under Example 6, with the exception that the drying time was 3 and ¼ hours. Molded articles were prepared from the dried composition as mentioned under Example 6, with the exception that wood flour filler was used in place of alpha flock and the molding temperature was about 135° C. The molded articles were mechanically strong, showed good plastic flow during molding and had a good surface appearance.

Example 8

A resinous syrup was prepared using the same formulation and method as in Example 7 with the exception that the acetic acid solution was omitted. This syrup was compounded with 71.3 parts alpha flock and 0.59 part zinc stearate, dried for 90 minutes at 55° C., after which 3.51 parts phthalic anhydride (curing catalyst) was ball-milled with the dried composition. The resulting molding compound was molded for 3 minutes at 130° C. and under a pressure of about 4000 pounds per square inch, yielding well-cured, strong, molded articles of good appearance.

Example 9

| | Parts |
|---|---|
| Urea | 54 |
| Aqueous ammonia (28%) | 7.6 |
| Aqueous solution of formaldehyde (approximately 37.2% HCHO) | 161 |
| Sodium hydroxide in 1.5 parts water | 0.06 |
| Malonic diamide | 10.2 |
| Mono-chloracetamide | 3.51 |

The urea, ammonia, formaldehyde and sodium hydroxide were mixed in the stated order and, when solution had occurred, the malonic diamide was added and the mass refluxed for 30 minutes. A halogenated amide, specifically mono-chloracetamide, was now added and heating continued under reflux for an additional 12 minutes. The halogenated amide intercondensed with the partial condensation product of urea, formaldehyde and malonic diamide to yield a resin syrup capable of curing under heat without the addition of a latent or an active curing catalyst. The resulting resin syrup was compounded with 71.3 parts alpha flock and 0.59 part zinc stearate, then dried for 90 minutes at about 55° C. The dried composition was molded as described under Example 1, yielding molded articles having the same general properties and appearance as the product of that example.

Example 10

| | Parts |
|---|---|
| Urea | 54 |
| Aqueous ammonia (28%) | 15 |
| Aqueous solution of formaldehyde (approximately 37.2% HCHO) | 161 |
| Malonic diamide | 10.2 | were mixed in the order named and heated under reflux for 30 minutes. The resulting resin syrup was compounded with 71 parts alpha flock and 0.6 part zinc stearate, then dried for 3 hours and 25 minutes at about 55° C. Molded articles obtained by a heat-and-pressure treatment (130° C., 4000 pounds per square inch pressure) of the dried composition showed good plastic flow during molding, had a good surface appearance and were well-cured throughout.

Example 11

A resin syrup was prepared as in Example 10. To this syrup 6 parts of 10% acetic acid solution were added, after which the mass was refluxed for an additional 5 minutes. A molding composition was prepared from the resulting syrup as described under Example 10, with the exception that the drying time at 55° C. was only 1 hour and 41 minutes. Molded articles were made from the dried composition as stated under Example 10. Both the resin syrup and the molding compositions made therefrom cured more rapidly to the insoluble, infusible state than the corresponding products of Example 10 and, in cured state, had the same general properties as the products of that example.

Example 12

A resin syrup was prepared as in Example 10. Then 3.6 parts chloracetamide were added and the mass was refluxed for 5 minutes. In this way a heat-convertible resinous composition comprising a soluble, fusible resinous reaction product of urea, formaldehyde, malonic diamide and chloracetamide is obtained. A molding compound was made from this composition as described under Example 10, with the exception that the drying time was 2 hours and 7 minutes. Molded articles made from the dried compound by heating at 130° C. under a pressure of about 4,000 pounds per square inch were strong, well-cured and of good surface appearance, and showed excellent resistance to moisture, heat and discoloration. Both the resin syrup and the molding compositions prepared therefrom cured more rapidly under heat to the insoluble, infusible state than the corresponding products of Example 11.

*Example 13*

| | Parts |
|---|---|
| Urea | 54 |
| Hexamethylene tetramine | 7 |
| Aqueous solution of formaldehyde (approximately 37.2% HCHO), neutral | 151 |
| Malonic diamide | 10.2 | were mixed in the above order and heated under reflux for 30 minutes. The resulting resin syrup was compounded with 77.9 parts alpha flock and 0.56 part zinc stearate, thereafter being dried for 1 hour and 35 minutes at 55° C. Molded articles obtained by molding the dried composition for 3 minutes at 130° C. under a pressure of 4,000 pounds per square inch were hard, dense and, in general, had those properties which would adapt the article to a wide variety of service applications. The molded articles showed good plastic flow during molding and had a uniform cure throughout the entire piece.

*Example 14*

A resin syrup was prepared as in Example 13. To this syrup was added 0.04 part hydrochloride acid in 11.1 parts water. A molding compound was prepared from the resulting syrup as described under Example 13, with the exception that the drying time was 1 hour and 55 minutes at 55° C. Molded articles produced from the dried composition as described under Example 13 had the same general characteristics as the products of that example. Both the resin syrup and molding compounds made therefrom show a faster cure to the insoluble, infusible state than the corresponding compounds of Example 13.

*Example 15*

A resin syrup was prepared as in Example 13. To this syrup was added 5.6 parts of a 10% acetic acid solution. A molding composition was made from this syrup as described under Example 13, with the exception that the drying time was 2 hours and 5 minutes. Molded articles prepared from the dried compound as described under Example 13 had the same general properties as the products of that example.

*Example 16*

Same as Example 15 with the exception that 3.33 parts phthalic anhydride were incorporated into the molding composition instead of adding 5.6 parts of 10% acetic acid solution to the resin syrup. The time of drying the wet mix at 55° C. was 95 minutes. Molded articles made from the dried compound as described under Example 13 were much the same in their properties as the products of that example.

*Example 17*

A resin syrup was prepared as in Example 13. With this resin syrup was incorporated 3.33 parts chloracetamide, 77.9 parts alpha flock and 0.56 part zinc stearate. The resulting wet mix was heated for 3 hours and 52 minutes at about 55° C. to cause the chloracetamide to intercondense with the partial condensation product of urea, malonic diamide, formaldehyde and hexamethylene tetramine simultaneously with the evaporation of water from the mass. When the dried mass was molded at 135° C. and 4,000 pounds per square inch pressure, molded articles of exceptional resistance to heat, moisture and discoloration were obtained. The molded products showed good plastic flow during molding, had excellent mechanical strength and were free from surface irregularities. The molding compounds had better time stability than similar compounds containing a latent or an active curing catalyst. The compounds cured rapidly and homogeneously under heat to the insoluble, infusible state.

*Example 18*

Essentially the same procedure was followed as described under Example 17 with the exception that, instead of a halogenated amide, a halogenated acylated urea, specifically chloroacetyl urea, was intercondensed with the partial condensation product of the reactants of Example 13 simultaneously with the drying of the molding composition. The drying time was 4 hours. Molded articles prepared from the dried compound as described under Example 17, using a molding temperature of about 130° C., had the same general properties as the products of that example.

*Example 19*

| | Parts |
|---|---|
| Aqueous solution of formaldehyde (approximately 37.2% HCHO), neutral | 161 |
| Urea | 54 |
| Hexamethylene tetramine | 1.4 |
| Malonic diamide | 10.2 |
| Sodium hydroxide in 1.5 parts water | 0.6 |
| 10% acetic acid solution | Small amount |

All of the above components with the exception of the acetic acid solution were mixed in the order named, after which the mixture was heated at the boiling temperature of the mass (that is, under reflux) for 40 minutes. A small amount, specifically 34 drops, of a 10% acetic acid solution was now added and heating continued under reflux for an additional 10 minutes. A molding composition was prepared by compounding the resulting resin syrup with 75.6 parts alpha flock and 0.57 part zinc stearate and drying the resulting mass for 3½ hours at 55° C. Well-cured molded articles of good strength and appearance, and showing good plastic flow during molding, were produced by molding the dried compound for 6 minutes at 135° C. under a pressure of about 4,000 pounds per square inch.

*Example 20*

Same as Example 19 with the exception that, instead of adding a small amount of 10% acetic acid solution to the initial resin syrup and continuing heating of the mass, a molding composition was prepared by compounding the resin syrup with 75.6 parts alpha flock, 0.57 part zinc stearate and 1.14 parts phthalic anhydride dispersed in alcohol. The resulting wet mix was dried 5 hours and 40 minutes at 55° C. Molded articles prepared from the dried compound as described under Example 19 had the same general properties as the products of that example.

*Example 21*

Same as Example 19 with the exception that, instead of the acetic acid solution, 0.04 part hydrochloric acid in 11.4 parts water was added to the reaction mass and refluxing was continued for an additional 10 minutes after the initial 40-minute reflux period. Molding compositions and molded articles were prepared from the resulting resin syrup as described in Example 19. The time of drying the wet mix was 4 hours. The molded articles had the same general properties as the products of Example 19.

Example 22

A resin syrup was prepared as in Example 19 omitting the acetic acid solution from the formulation. To the resin syrup obtained by refluxing the reactants for 40 minutes was added 1.14 part chloroacetyl urea, 75.6 parts alpha flock and 0.57 part zinc stearate. The resulting wet mix was heated for 13½ hours at 55° C. to cause the chloroacetyl urea to intercondense with the product of partial condensation of the reactants of Example 19 simultaneously with the evaporation of the water from the mass. Molded articles made from the dried compound as described under Example 19 had excellent resistance to heat, moisture and discoloration, were mechanically strong, well-cured throughout, had a good surface appearance and showed good plastic flow during molding.

Example 23

A resin syrup was prepared as in Example 19 omitting the acetic acid solution from the formulation. Instead, a latent curing catalyst, specifically sodium chloroacetate, was added to the syrup obtained after 40 minutes' refluxing of the mixed components, and heating under reflux was continued for an additional 10 minutes. The resulting syrup was compounded with 75.6 parts alpha flock and 0.57 part zinc stearate, after which the wet mass was dried for 5 hours at 55° C. Molded articles produced by molding the dried compound for 5 minutes at 130° C. under a pressure of 4000 pounds per square inch had the same general properties as the products of Example 19.

Example 24

Same as Example 23 with the exception that, instead of adding 1.14 parts sodium chloroacetate, a small amount (46 drops) of diethyl chloracetamide was added to the resin syrup as a latent curing catalyst and the mass was refluxed for 10 minutes after the 40-minute initial reaction period. Molding compositions and molded articles were prepared as described under Example 23 with the exception that the time of drying the wet mix was 3 and ¾ hours and the molding temperature was about 135° C. The properties of the molded articles were much the same as those of the products of Example 19.

Example 25

| | Parts |
|---|---|
| Urea | 54 |
| Aqueous ammonia (28%) | 7.5 |
| Aqueous solution of formaldehyde (approximately 37.2% HCHO) | 161 |
| Sodium hydroxide in 1½ parts water | 0.06 |
| Malonic diamide | 10.2 |
| Mono-chloracetamide | 0.92 |

All of the above components with the exception of the chloracetamide were mixed in the above order and heated under reflux for 30 minutes. The chloracetamide dissolved in a small amount of water was added to the resulting resin syrup. Eight sheets of paper of the kind used in making laminated articles were impregnated with this resin syrup and allowed to air dry until they more readily could be handled, followed by drying at 55° C. for 65 minutes. The chloracetamide intercondensed with the partial condensation product of the other reactants concurrently with the evaporation of water from the resin-impregnated paper. The dried sheets were superimposed and laminated together by heating for 30 minutes at 130° C. under a pressure of 1500 pounds per square inch. Pressure was applied to the sheets with the platens at room temperature. The laminated product was cooled before removal from the press. The laminated sheets were well bonded together. The laminated product had a good surface appearance and excellent resistance to water. It showed no evidence of delamination or of otherwise being attacked when subjected to boiling water for 5 minutes. A product similarly made using 1.38 parts mono-chloracetamide also had these same general properties.

It will be understood, of course, by those skilled in the art that my invention is not limited to the specific reactants named in the above illustrative examples. Thus, instead of formaldehyde other compounds engendering formaldehyde may be employed, for example paraformaldehyde, hexamethylene tetramine, etc. Other aliphatic or heterocyclic aldehydes also may be used, the particular aldehyde depending upon economic considerations and the particular properties desired in the end-product. For instance, in certain cases I may use acetaldehyde, propionaldehyde, butyraldehyde, acrolein, methacrolein, crotonaldehyde, furfural, etc., mixtures thereof, or mixtures of formaldehyde or compounds engendering formaldehyde with such aldehydes.

Also, I may use not only urea itself but related substances such as thiourea; iminourea (guanidine); aldehyde-reactable derivatives of urea, thiourea and iminourea such as methyl urea, acetyl urea, benzoyl urea, phenyl thiourea, asymmetrical diethyl urea, allyl urea, 2-chloroallyl urea, ethylidene urea, methylol urea, methylene urea, dicyandiamide (cyano-iminourea), guanyl urea, guanylthiourea, biguanidine, aminoguanidine, creatine (guanidine methyl glycine) and guanoline. The term "a urea" as used generally herein and in the appended claims includes within its meaning substances of the kinds above mentioned. Other examples of modifying reactants that may be used are aminotriazoles, creatinine, ethylene pseudosulfocarbamide derivatives, sulfohydantoin, triazine derivatives, e. g., melamine (an aminotriazine), etc.

Likewise malonic compounds other than malonic diamide may be used separately, or mixed with each other or with malonic diamide. Illustrative examples of other malonic compounds that may be employed are methylene cyanide and compounds having the graphic formula

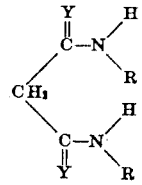

where Y represents a member of the class consisting of oxygen and sulfur and R represents a member of the class consisting of hydrogen; alkyl, aryl (including naphthyl), aralkyl, alkaryl, acyl, hydrocyclic and heterocyclic radicals; and nitro, halogeno, aceto, carbalkoxy and acetoxy derivatives of such radicals. Illustrative examples of other malonic compounds that may be employed are compounds having the graphic formula

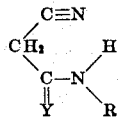

where Y and R have the meanings given in the preceding sentence. More specific examples of compounds coming within the scope of the above formulas are cyanoacetamide, monothio malonic diamide, dithio malonic diamide, cyanothio acetamide, N, N'-dialkyl (e. g., -dimethyl, -diethyl, -dipropyl, etc.) malonic diamides and dithioamides; N,N'-diphenyl, -ditolyl, -dibenzyl, -diphenethyl, -dicinnamyl, -di(para-hydroxy phenyl) and -di(para-amino phenyl) malonic diamides and dithioamides; and N-methyl, -ethyl, -propyl, -isobutyl, -phenyl, -tolyl, -benzyl, -phenethyl, -cinnamyl, -para-hydroxy phenyl, -para-amino phenyl, -acetoxy, -propionoxy, -butyroxy and -carbalkoxy cyanoacetamides and cyanothioacetamides.

It also will be understood not only that mixtures of malonic compounds may be used but likewise that mixtures of the other reactants may be employed in order to impart particular characteristics to the end-product. For example, I may use in certain cases mixtures of urea and urea derivatives (or substances of the nature of urea) or mixtures of urea derivatives and substances of the nature of urea, e. g., mixtures of urea and thiourea, thiourea and allyl urea, urea and melamine, thiourea and guanidine, etc. The plurality of urea bodies may be intercondensed with a single aliphatic aldehyde or with a plurality of aliphatic aldehydes using either a single malonic compound or a plurality of malonic compounds. Also, of course, a single urea body may be intercondensed with one or more aliphatic aldehydes and one or more malonic compounds.

As shown by the foregoing example the potentially reactive resins of this invention may have incorporated therewith a latent or an active curing catalyst to accelerate the conversion of the resin to the insoluble, infusible state. In some examples, I showed how diethyl chloracetamide could be used as a latent curing catalyst. Diethyl chloracetamide is a halogenated amide of a secondary amine; more particularly it is a member of the class consisting of the alpha halogenated, the beta halogenated and the alpha and beta halogenated amides of secondary amines. Reference is made to my copending application Serial No. 288,033, filed August 2, 1939, now Patent No. 2,293,454 for illustrative examples of other halogenated amides of this class which may be used as latent curing catalysts in practicing the present invention. Also, as described in a number of the above examples, I may intercondense into the initial condensation products other components which impart self-curing characteristics to the resinous mass and which properly may be described as curing reactants as distinguished from the active (direct) and latent curing catalysts. Such components may be, for example:

(1) A halogenated amide selected from the class consisting of alpha halogenated amide, beta halogenated amide and alpha, beta halogenated amide, the amide grouping of the said amides being

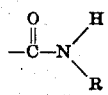

where R is hydrogen, or an alkyl, aryl (including naphthyl), aralkyl, alkaryl, acyl, hydrocyclic or heterocyclic radical, or a nitro, halogeno, aceto, carbalkoxy or acetoxy derivative of the said radicals. An example of such a halogenated amide is chloracetamide. Reference is made to my copending application Serial No. 289,277, filed August 9, 1939, Patent No. 2,285,418 for illustrative examples of other halogenated amides of this class which may be used.

(2) An aldehyde-reactable halogenated acylated urea in which at least one halogen atom is attached to an alpha carbon atom, a beta carbon atom or alpha and beta carbon atoms, e. g., mono-chloroacetyl urea. Reference is made to my copending application Serial No. 289,273, filed August 9, 1939, Patent No. 2,281,559, for illustrative examples of other halogenated acylated ureas of this class which may be used.

(3) A halogenated nitrile of the class in which at least one halogen atom is attached to an alpha, beta or gamma carbon atom or to any two or all of such carbon atoms, e. g., chloroacetonitrile. Reference is made to my copending application Serial No. 289,274, filed August 9, 1939, for illustrative examples of other halogenated nitriles of this class which may be used.

(4) A halogenated aldehyde in which at least one halogen atom is attached to an alpha carbon atom, a beta carbon atom, or alpha and beta carbon atoms, e. g., chloral hydrate. Reference is made to my copending application Serial No. 289,275, filed August 9, 1939, Patent No. 2,277,480, for illustrative examples of other halogenated aldehydes of this class which may be used.

(5) A halogenated ketone of the class of ketones in which at least one halogenated atom is attached to a carbon atom or atoms located alpha or beta or alpha and beta to the keto group, e. g., chloroacetone. Reference is made to my copending application Serial No. 289,276, filed August 9, 1939, for illustrative examples of other halogenated ketones of this class which may be used.

(6) An aldehyde-reactable nitrated urea, for example nitrourea and sodium nitrourea. Reference is made to the copending application of Gaetano F. D'Alelio and Joe B. Holmes, Serial No. 289,281, filed August 9, 1939, Patent No. 2,263,289, for illustrative examples of other nitrated ureas of this class which may be used.

(7) An aldehyde-reactable basic amine salt, e. g., methylene diamine monohydrochloride. Reference is made to my copending application Serial No. 289,278, filed August 9, 1939, for illustrative examples of other basic amine salts of this class which may be used.

(8) An aldehyde-reactable aminoamide salt, e. g., aminoacetamide hydrochloride. Reference is made to my copending application Serial No. 289,279, filed August 9, 1939, for illustrative examples of other aminoamide salts of this class which may be used.

(9) An aminoalcohol salt, e. g., diethanolamine hydrochloride. Reference is made to my copending application Serial No. 289,280, filed August 9, 1939, for illustrative examples of other aminoalcohol salts which may be used.

If desired, the fundamental resins of this invention may be modified by introducing other bodies before, during or after condensation between the primary components. These addition agents may take the form of high molecular weight bodies with or without resinous characteristics, for example partially hydrolyzed wood products, lignin, proteins, protein-aldehyde condensation products, furfural condensation products, phenol-aldehyde condensation products, aniline-aldehyde condensation products, modified or unmodified, saturated or unsaturated polybasic acid-polyhydric alcohol condensation products, sulfonamide-aldehyde resins, water-soluble cellulose derivatives, natural gums and resins such as copal, shellac, rosin, etc.; polyvinyl compounds such as polyvinyl alcohol, polyvinyl acetate, polyvinyl acetals, specifically polyvinyl formal, synthetic linear condensation products such as the superpolyamides, etc. As modifying agents for certain special applications I may use, for example, monohydric alcohols such as ethyl, propyl, isopropyl, butyl, amyl, etc., alcohols; polyhydric alcohols, e. g., ethylene glycol, diethylene glycol, glycerol, pentaerythritol trimethylol nitromethane, etc.; monoamides such as foramide, acetamide, stearamide, acrylic acid amides (acryloamides), benzamide, toluene sulfonamide, etc.; polyamides such as adipic diamide, phthalamide and the like; amines such as ethylene diamine, aniline, phenylene diamine, amino phenols, etc.

Although modifying agents of a plasticizing or softening nature usually are not required, for certain intricate molding jobs such as are found in transfer and injection molding the addition of such substances may be desirable. Examples of suitable plasticizers which may be used when necessary are the phthalate esters, for instance dimethyl phthalate, diethyl phthalate, dibutyl phthalate, etc., the phosphate esters such as tricresyl phosphate, triphenyl phosphate, etc.

Dyes, pigments and opacifiers (e. g., barium sulfate, zinc sulfide, titanium compounds such as the oxides, flaked aluminum, copper and the like) may be incorporated into the compositions to alter the visual appearance and the optical properties of the finished product. Mold lubricants such as the metallic soaps of the high molecular weight fatty acids, for example the stearates and palmitates of tin, zinc, etc., waxes such as carnauba, high melting point paraffin waxes, etc., may be added to facilitate molding of the compositions. Various fillers may be used to provide a wide variety of molding compositions. The choice of the filler depends upon the particular application for which the molded article is to be used. As fillers may be used, for instance, bleached or unbleached wood flour, alpha cellulose in flock form, sheets or cuttings of paper, cloth, canvas, etc., asbestos in powdered or long or short fiber length, powdered or flaked mica, wood chips, short or long wood fibers, synthetic or natural continuous threaded fibers, glass fibers in continuous filament or fabric (woven or felted) form, etc.

In the preparation of molding compositions from the resinous bodies of this invention, the non-dehydrated or the partially dehydrated resins may be compounded with the above addition agents in accordance with procedures well-known to those skilled in the plastics art. The wet composition may be dried in the usual manner either at normal (room) temperature or at elevated temperatures in a preheated stream of air or under the influence of reflected heat energy. The dried compound may be densified through the usual process of working in a Banbury mixer, or by rolling, pelleting or other means, followed by grinding and screening to the desired particle size. The molding compositions may be molded at elevated temperatures, preferably between 100° and 150° C., and at suitable pressures. The molding pressures generally range between about 1000 and about 4000 or 5000 pounds per square inch.

In addition to their use in molding compositions, the condensation products of this invention are especially suitable for use as fire retardants, water repellents and sizings when applied to wood or the like, or to fibrous materials such as silk, cotton, wool, synthetic organic fibers, etc., in continuous filament, thread, fabric or other form. It will be understood, of course, that optimum resistance to water, fire, solvents, etc., is obtained only when the applied coating or sizing is converted to the insoluble, infusible state.

The modified or unmodified products of this invention have a wide variety of other uses, for instance in making interior finishing materials for homes, offices, etc., in making buttons, clock cases, radio cabinets, dishes and other household utensils, decorative novelties and various other cast, molded and laminated articles of manufacture. They also are suitable for use in making paints, varnishes, lacquers, enamels and other protective surfacing materials, in the manufacture of arc-extinguishing tubes capable of evolving an arc-extinguishing gas under the heat of the arc, in the production of wire or baking enamels, for general adhesive applications, for instance in bonding or cementing together mica flakes to form a laminated mica article, or superimposed sheets of paper, cloth, etc., to form a laminated sheet material, as impregnants for electrical coils and other electrical devices, and for other purposes.

What I claim as new and desire to secure by Letters Patent of the United States is:

1. A composition comprising a resinous product of reaction of ingredients comprising (1) a urea, (2) an aldehyde of the class consisting of aliphatic aldehydes and furfural, and (3) an organic compound having the graphic formula

where X is a member of the class consisting of nitrile radicals, and carbamyl and thiocarbamyl radicals having at least one hydrogen atom attached directly to the nitrogen atom thereof.

2. A composition as in claim 1 wherein the aldehyde reactant is formaldehyde.

3. A resinous composition comprising the product of reaction of ingredients comprising a urea, an aliphatic aldehyde and an organic compound having the graphic formula

where X is a nitrile radical.

4. A resinous composition comprising the product of reaction of a plurality of reactants including a urea, an aliphatic aldehyde and an organic compound having the graphic formula

where X is a carbamyl radical having at least one hydrogen atom attached directly to the nitrogen atom thereof.

5. A resinous composition comprising the product of reaction of ingredients comprising a urea, an aliphatic aldehyde and an organic compound having the graphic formula

where one X is a nitrile radical and the other X is a carbamyl radical having at least one hydrogen atom attached directly to the nitrogen atom thereof.

6. A composition comprising the resinous condensation product of ingredients comprising a urea, an aliphatic aldehyde and malonic diamide.

7. A resinous composition comprising the product of reaction of ingredients comprising urea, formaldehyde and malonic diamide.

8. A resinous composition comprising the product of reaction of ingredients comprising urea, formaldehyde and cyanoacetamide.

9. A composition comprising an alkaline-catalyzed resinous reaction product of a plurality of reactants including a urea, an aliphatic aldehyde and an organic compound having the graphic formula

where X is a member of the class consisting of nitrile radicals, and carbamyl and thiocarbamyl radicals having at least one hydrogen atom attached directly to the nitrogen atom thereof.

10. A resin obtained by reaction of ingredients comprising urea, formaldehyde and malonic diamide in the presence of an alkaline catalyst.

11. A composition comprising the resinous product of reaction of a partial condensation product of ingredients comprising malonic diamide and formaldehyde with a partial condensation product of ingredients comprising urea and formaldehyde.

12. A heat-convertible resinous composition comprising a soluble, fusible resinous reaction product of ingredients comprising (1) formaldehyde, (2) urea and (3) an organic compound having the graphic formula

where X is a member of the class consisting of nitrile radicals, and carbamyl and thiocarbamyl radicals having at least one hydrogen atom attached directly to the nitrogen atom thereof.

13. A product comprising the cured resinous composition of claim 12.

14. A heat-convertible resinous reaction product of formaldehyde with urea and malonic diamide.

15. A heat-convertible resinous composition comprising a soluble, fusible resinous reaction product of ingredients comprising urea, formaldehyde, malonic diamide and chloracetamide.

16. A product comprising the cured resinous composition of claim 15.

17. A molding composition comprising a filler and a heat-convertible resinous product of reaction of ingredients comprising urea, malonic diamide and formaldehyde.

18. An article of manufacture comprising the heat-hardened molding composition of claim 17.

19. The method of producing a resinous composition which comprises reacting to resin formation ingredients comprising a urea, an aliphatic aldehyde and an organic compound having the graphic formula

where X is a member of the class consisting of nitrile radicals, and carbamyl and thiocarbamyl radicals having at least one hydrogen atom attached directly to the nitrogen atom thereof.

20. A composition comprising a heat-convertible resinous product of reaction of (1) a urea, (2) an aliphatic aldehyde, (3) an organic compound having the graphic formula

where X is a member of the class consisting of nitrile radicals, and carbamyl and thiocarbamyl radicals having at least one hydrogen atom attached directly to the nitrogen atom thereof, and (4) a curing reactant.

21. A composition comprising a resinous product of reaction of ingredients comprising urea, melamine, formaldehyde and an organic compound having the graphic formula

where X is a member of the class consisting of nitrile radicals, and carbamyl and thiocarbamyl radicals having at least one hydrogen atom attached directly to the nitrogen atom thereof.

22. A composition comprising (1) a resinous material obtained by reaction of ingredients comprising a urea, formaldehyde and an organic compound having the graphic formula

where X is a member of the class consisting of nitrile radicals, and carbamyl and thiocarbamyl radicals having at least one hydrogen atom attached directly to the nitrogen atom thereof, and (2) another synthetic resin.

GAETANO F. D'ALELIO.